United States Patent [19]

Dickinson

[11] 4,131,446

[45] Dec. 26, 1978

[54] METHOD AND APPARATUS FOR MANUFACTURING FLAT GLASS ON MOLTEN METAL

[75] Inventor: George A. Dickinson, St. Helens, England

[73] Assignee: Pilkington Brothers Limited, St. Helens, England

[21] Appl. No.: 853,459

[22] Filed: Nov. 21, 1977

Related U.S. Application Data

[63] Continuation-in-part of Ser. No. 840,328, Oct. 7, 1977, abandoned, which is a continuation of Ser. No. 776,482, Mar. 10, 1977, abandoned.

[30] Foreign Application Priority Data

Nov. 30, 1976 [GB] United Kingdom .............. 49918/76

[51] Int. Cl.² ........................................... C03B 18/02
[52] U.S. Cl. ................................. 65/99 A; 65/182 R
[58] Field of Search ........................... 65/99 A, 182 R

[56] References Cited

U.S. PATENT DOCUMENTS

| | | | |
|---|---|---|---|
| 2,911,759 | 11/1959 | Pilkington | 65/182 R |
| 3,356,479 | 12/1967 | Galey | 65/99 A |
| 3,467,512 | 9/1969 | Loukes et al. | 65/99 A |
| 3,479,171 | 11/1969 | Robinson et al. | 65/182 R X |
| 3,489,543 | 1/1970 | Kita et al. | 65/25 A |
| 3,503,728 | 3/1970 | Itakura | 65/65 A X |
| 3,721,543 | 3/1973 | Classen et al. | 65/99 A X |
| 4,012,216 | 3/1977 | Marchand | 65/99 A |

Primary Examiner—Arthur D. Kellogg
Attorney, Agent, or Firm—Burns, Doane, Swecker & Mathis

[57] ABSTRACT

In flat glass manufacture on a molten metal bath, there is forward flow of molten metal entrained by accelerating glass over an upstream return flow of cooler molten metal which is received in a deepened region of the bath. Upstream molten metal flows are drawn from that deepened region to replenish the molten metal entrained by the accelerating ribbon.

38 Claims, 8 Drawing Figures

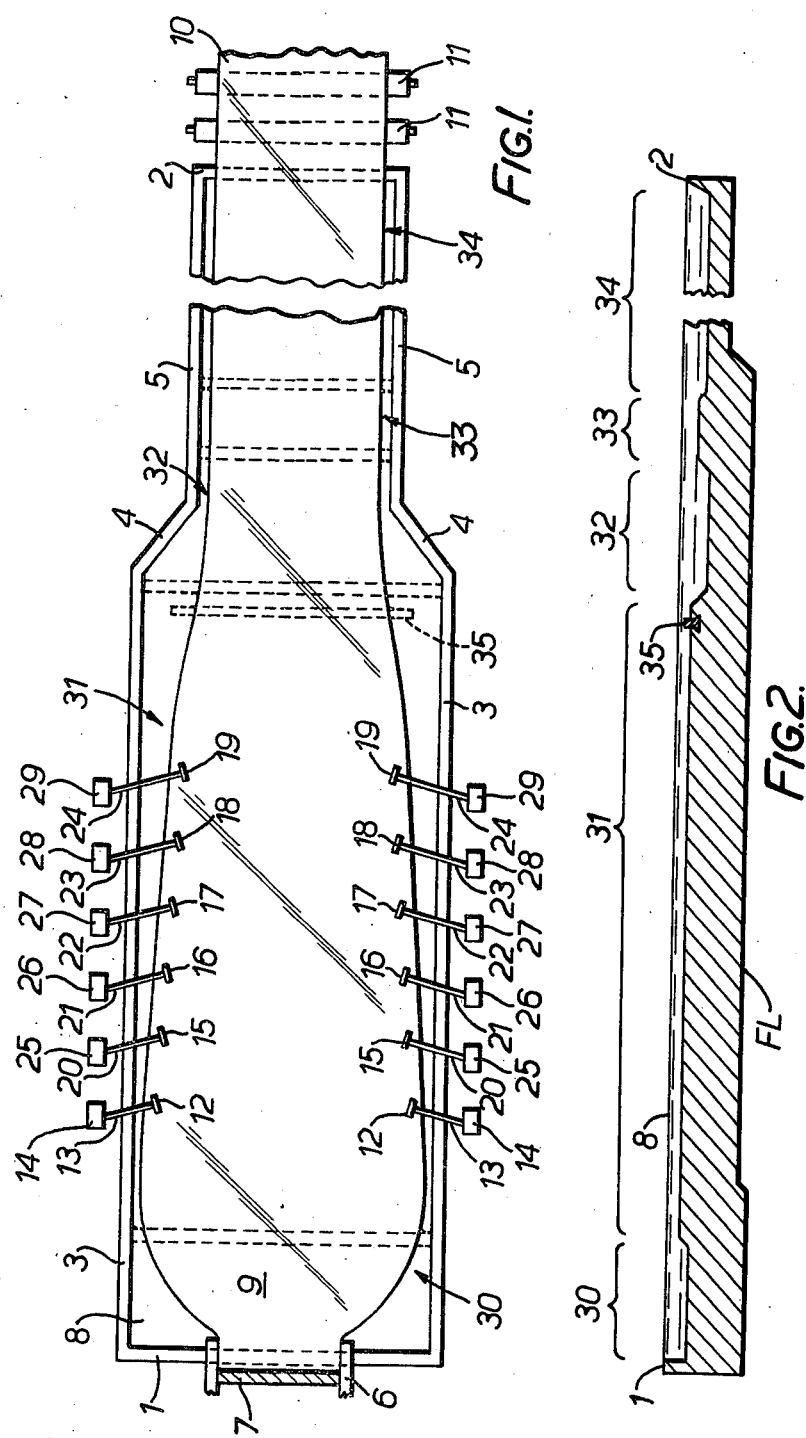

METHOD AND APPARATUS FOR MANUFACTURING FLAT GLASS ON MOLTEN METAL

CROSS REFERENCES TO RELATED APPLICATIONS

This is a continuation-in-part of Application Serial No. 840,328 filed Oct. 7, 1977, now abandoned, which was a continuation of Application Serial No. 776,482 filed Mar. 10, 1977 and subsequently abandoned.

BACKGROUND OF THE INVENTION

1. Field of the Invention

This invention relates to the manufacture of flat glass. More particularly the invention relates to the manufacture of thin flat glass by the float process, for example float glass of thickness in the range 1.5 mm to 5 mm and more especially in the range 1.5 mm to 3 mm.

2. Description of the Prior Art

In the float process for flat glass manufacture, molten glass is delivered at a controlled rate on to one end, the hot end, of a molten metal bath contained in an elongated tank structure. Usually the molten metal bath is of molten tin or of a molten tin alloy in which tin predominates. The final ribbon of glass is discharged from the bath by traction means, usually driven traction rollers, disposed beyond the outlet end of the bath, which traction means applies tractive force to advance the ribbon along the bath.

In some ways of operating the float process, regulation of the applied tractive effort is effected along with regulation of the thermal conditions to which the advancing ribbon of glass in subjected so as to attenuate the ribbon to a desired width and thickness. Outwardly and longitudinally directed marginal forces may be applied to the glass while it is being attenuated so as to control gradual and progressive reduction of width and thickness of the ribbon until the ribbon of glass reaches a desired width and thickness. The thermal control is such that when the desired width and thickness of the ribbon is achieved, the velocity of the glass is at a value at which further dimensional change cannot take place under the applied tractive effort.

It has previously been found, particularly when operating under high load conditions, for example at a rate of delivery of molten glass to the bath of 2,000 tonnes per week or more, that a high speed of discharge of the ultimate ribbon of glass from the bath, for example greater than 10 metres per minute, is necessary when attenuating the glass to thicknesses for example below 3mm. It has further been found that the advancing ribbon of glass, when it is accelerating during attenuation to a uniform high speed for discharge from the bath, entrains an appreciable quantity of the molten metal of the bath along the bath surface towards the outlet end of the bath, which surface flow induces an upstream return flow of cooler molten metal from the outlet end of the bath along the bottom of the bath towards the zone of the bath where the ribbon of glass is being attenuated. In this zone the glass is at a viscosity such that it is particularly susceptible to temperature variations across the surface of the molten metal bath, and it has been found that distortion introduced into the underface of the ribbon of glass in this attenuation zone is present in the ultimate ribbon.

Temperature variations across the surface of the bath can result from a temperature gradient through the depth of the bath and it is therefore desirable to minimise such temperature gradients, particularly in the attenuation zone. However, the problem is encountered that although a relatively small temperature gradient can be achieved by a relatively shallow bath depth at low ribbon speeds, a high ribbon speed over a shallow bath depth produces turbulence in the molten metal from which distortion in the ribbon can result. On the other hand, although a greater bath depth will reduce turbulence at high ribbon speeds, it will inherently give a greater temperature gradient through the bath depth which can thermally introduce distortion into the ribbon.

It has previously been proposed in United States Patent Application Serial No. 527,615, filed Nov. 27, 1975, to combat the introduction of such distortion into the ribbon of glass in the attenuation zone by employing a first barrier at a first location in the region of the downstream end of said attenuation zone to constrain molten metal flow at that location to forward flow of molten metal entrained beneath the ribbon and counterflow of molten metal alongside the ribbon from downstream of that location, and employing a second barrier at a second location spaced upstream from said first location and in the region of maximum acceleration of the glass to constrain molten metal flow at that second location to forward flow of molten metal entrained beneath the accelerating glass and counterflow of molten metal alongside the ribbon from downstream of the second location, there being established lateral access into the region of the bath supporting the ribbon between said first and second locations for said counterflow of molten metal at said first location to ensure replenishment of the molten metal of the bath in the attenuation zone between the first and second locations. It has been found that such arrangement can advantageously reduce the temperature difference between the surface molten metal and the molten metal beneath the surface in the attenuation zone, thereby reducing temperature variations in this zone which tend to introduce distortion into the ribbon.

It is a main object of the present invention to provide simplified control of the temperature of the counterflows of molten metal replenishing the molten metal in the attenuation zone.

SUMMARY

The present invention provides a method of and apparatus for manufacturing flat glass in which a ribbon of glass is advanced along a molten metal bath.

Upstream return flow of cooler molten metal is received in a region of greater bath depth than the bath depth in an adjacent region, and upstream molten metal flows are drawn from that deepened region to replenish the molten metal entrained by the accelerating ribbon.

Preferably the region of greater bath depth is over abutting refractory blocks of the tank floor whose upper faces are at a lower level than the upper faces of the blocks under said adjacent region of the bath. This region of greater bath depth may be just downstream of an attenuation zone of the bath where the ribbon is being attenuated to a desired thickness.

Molten metal flow may be constrained at a location immediately upstream of the deepened region of the bath, to forward flow entrained beneath the ribbon and counterflows alongside the ribbon from the deepened region.

BRIEF DESCRIPTION OF THE DRAWINGS

Some embodiments of the invention will now be described, by way of example, with reference to the accompanying drawings in which:

FIG. 1 is a plan view of an elongated tank structure containing a bath of molten metal for use in the float process for the manufacture of thin flat glass by the method of the invention, FIG. 2 is a longitudinal section through a floor of the tank structure of FIG. 1.

DESCRIPTION OF THE PREFERRED EMBODIMENTS

Figure 3:
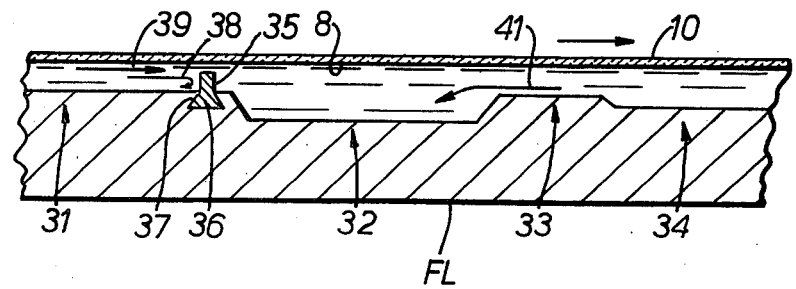
FIG. 3 is an enlarged view of part of FIG. 2 further showing a glass ribbon.

Referring to the drawings, FIG. 1 illustrates in plan an elongated tank structure for the manufacture of flat glass by the float process. The tank structure comprises an end wall 1 at its inlet end and an end wall 2 at its outlet end, and parallel side walls 3 extending from the inlet end to a shoulder region defined by inwardly inclined side wall portions 4 which connect the side walls 3 with further parallel side walls 5 extending to the outlet end. The tank structure contains a bath of molten metal which is usually molten tin. The geometry of the tank structure is such that it will accommodate between the side walls 3 of its wide part upstream of the shoulder region the maximum required glass layer on the bath surface, and between the side walls 5 of its narrow part downstream of the shoulder region the maximum required ultimate ribbon width.

Molten soda-lime-silica glass is delivered on to the bath at the inlet end of the tank structure by pouring from a spout 6 which extends over the inlet end wall 1. A regulating tweel 7 controls the rate of flow of molten glass over the spout on to the bath surface 8.

In manner well known in the float process, temperature regulators are provided in a roof structure not shown, which is mounted over the tank structure and defines a headspace over the bath in which a protective atmosphere is maintained. Temperature conditions at the inlet end of the bath are such that the molten glass 9 arriving on the bath is permitted to flow freely, laterally unhindered, during the first part of its advance along the bath. The temperature of the glass is about 990° C. when maximum spread is achieved and the glass thickness is of the order of 7 mm. The layer of molten glass is advanced in ribbon form and the ribbon is initially constituted by low viscosity glass, e.g. at a viscosity of about $10^{4.8}$ poises. This glass is gradually cooled during its initial advance along the bath and its viscosity slowly increases.

The temperature regulators in the roof structure set a temperature regime to which the advancing glass is subjected, which regime maintains the glass in a deformable state over a longitudinally extending region of the ribbon in which the glass is progressively attenuated as its velocity increases under the influence of tractive effort applied to the ultimate ribbon of glass 10 by driven rollers 11 located beyond the outlet end wall 2 of the tank structure. As the viscosity of the glass increases so does the influence of the longitudinally directed tractive force, originating from the rollers 11, in stretching the ribbon of glass. Gradual and progressive reduction in width and thickness of the glass is controlled by the use of top rolls which engage the upper surfaces of the margins of the glass.

Initially while the glass is at a low viscosity the margins of the ribbon are engaged by a pair of inclined top rolls 12 mounted at oppositely disposed positions on shafts 13 which extend through the tank side walls and are driven by motors 14. The top rolls 12 are knurled or toothed graphite, stainless steel, or mild steel rolls which are internally water cooled. The axes of the rolls are inclined at an angle to a line at right angles to the direction of advance of the ribbon of glass along the bath. Outwardly and longitudinally directed forces are thereby applied to the margins of the nascent ribbon, the outward force components providing restraint against undue loss in width. Slight attenuation of the ribbon is beginning to occur in this region.

Further similar pairs of top rolls 15, 16, 17, 18 and 19 are provided spaced along the tank structure, being mounted on respective shafts 20, 21, 22, 23 and 24 and driven by motors 25, 26, 27, 28 and 29, the top rolls of each pair being at oppositely disposed positions. With such pairs of top rolls at a series of spaced positions along the bath control of the progressive decrease in ribbon width and thickness is achieved. As the glass passes beyond the last pair of top rolls 19 its temperature is cooling below 880° C. corresponding to a viscosity of about $10^{5.2}$ poises.

After the glass leaves the furthest downstream pair of top rolls 19 its width and thickness continues to reduce until a position at or near the shoulder region of the tank structure where it viscosity, under the applied temperature regime, is so high that the ribbon assumes its final width and thickness and achieves its final discharge speed which is the effective surface speed of the rolls 11. At or near the shoulder region the usual soda-lime-silica glass has a viscosity of about $10^7$ poises, corresponding to a temperature of about 750° C., and is in a condition in which no further dimensional change can taken place under the influence of the applied traction. The ribbon cools further during its travel between the side walls 5 to the outlet end of the bath.

The glass is accelerated and the ribbon is attenuated in a zone upstream of the shoulder region of the tank structure. The downstream end of this attenuation zone is generally at or near the shoulder region, and the position of maximum acceleration of the glass is generally upstream towards the last pair of top rolls 19. As the ribbon is accelerating in the attenuation zone there is progressively increasing entrainment of molten metal of the bath in a forward surface flow which travels towards the outlet end of the bath. This forward surface flow is over an upstream return flow of cooler molten metal from the outlet end of the bath, and molten metal is continuously being drawn under the ribbon to compensate for that which is entrained. It is the generalised return flow of cooler molten metal along the bottom of the bath which produces top to bottom temperature gradients through the depth of the bath which have been shown to be particularly troublesome in the region of the bath where the rapidly accelerating ribbon is being attenuated, and particularly in the region between the last pair of top rolls 19 and the shoulder region. To combat this effect the floor of the tank structure in the shoulder region is designed as described below, so that the upstream return flow of cooler molten metal is received in a region of greater bath depth than the bath depth adjacent that deeper region.

FIG. 2 shows the profile of the floor FL of the tank structure which provides different bath depths at different regions along the bath length. At the inlet end of the bath the floor defines an initial region 30 of greater depth than the shallower region 31 following downstream, which latter region 31 provides the major length of the bath upstream of the shoulders and underlies virtually the entire attenuation zone. The initial region 30 may have a depth which is approximately one and a half times that of the downstream region 31. For example the region 30 may have a depth of 83 mm and the region 31 a depth of 58 mm.

The region 31 extends downstream to a position close to the shoulder region, for example to a position one or two meters upstream of a line joining the upstream ends of the shoulder side walls 4. At this position there begins a region 32 of greater bath than the bath depth adjacent that region. The deepened floor of the tank structure which defines the pocket region 32 is shaped as a recess in the floor extending across the full width of the bath. This pocket region 32 includes the shoulder region and extends downstream a distance of about 3 meters beyond a line joining the downstream ends of the shoulder side walls 4. The pocket region 32 extends, for example, lengthwise of the bath over a total distance of 7.5 meters, and provides a reserve zone for receiving cooler molten metal flow which is enforced in an upstream direction over the floor by the entrainment of hotter molten metal by the advancing ribbon of glass. The depth of the region 32 is approximately twice the bath depth in the adjacent upstream region 31. For example, when the depth of the region 31 is 58 mm the bath depth in the reserve zone 32 may be 108 mm.

Figure 8:
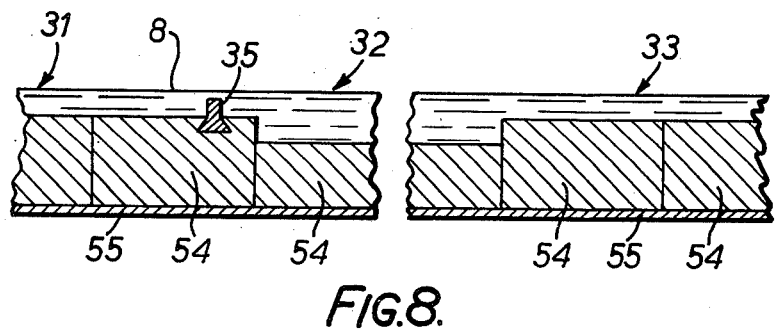
FIG. 8 is a longitudinal section through part of the floor of the tank structure illustrating another way of constructing the floor.

Downstream of the recess 32 the floor rises again, for example over a length of 3 meters to provide a region 33 adjacent the reserve zone of the same bath depth as that of the region 31 upstream of the reserve zone. From the region 33 to the outlet end of the bath the floor level is such as to provide a region 34 having a bath depth the same as that of the inlet end region 30 of the bath, that is, less than the depth of the reserve zone.

Where there is a change in floor level providing a change in bath depth the step in the floor may be chamfered as shown in FIG. 2 or an abrupt step as shown in FIG. 8.

The provision of a deepened reserve zone alone, such as the recessed pocket 32, in the region of the bath where the final discharge speed of the ribbon is achieved has been found to be beneficial, since the pocket receives the upstream return flow of cooler molten metal and mixes that cooler molten metal with molten metal held in the reserve zone, so that the cooler molten metal is heated and there is minimal risk of the introduction of thermal inhomogeneities beneath the accelerating glass due to molten metal flows drawn upstream from the reserve zone to replenish molten metal entrained by the accelerating ribbon.

The effect of the reserve zone is enhanced in the embodiments illustrated by the provision at a location immediately upstream of the region 32 of greater bath depth, of a transverse barrier 35 which projects upwardly from the floor. The barrier 35 is a carbon bar of upstanding rectangular cross-section and has a dove-tail base 36 FIG. 3, which is keyed into a matching dove-tail groove 37 formed transversely of the tank structure in the floor at the downstream end of the region 31, that is the region of the downstream end of the attenuation zone. The flat top of the bar is about 50 mm long in the direction of ribbon advance and is spaced from the level of the bath surface 8 by a sufficient distance to constrain molten metal flow at that location to forward flow entrained beneath the ribbon and counterflows alongside the ribbon from the region 32 of greater bath depth. The barrier 35 ensures that the lower layers of entrained molten metal of the forward flow are directed downwardly and then upstream as indicated by the arrow 38 in FIG. 3. Usually the top surface of the barrier 35 is from 6 mm to 15 mm below the level of the bath surface, the optimum distance depending on the speed and acceleration of the ribbon. In principle the top of the barrier 35 may be at a depth below the level of the bath surface 8 which is exactly such that all the entrained molten metal of the forward flow travels over the barrier but no return flow of molten metal can pass over it. In practice, however, such an exact setting may be difficult to achieve and the barrier height is therefore preferably set as described above to direct the lower layers of entrained molten metal of the forward flow downwardly and laterally as indicated at 38 thereby ensuring that molten metal flow over the barrier is constrained to forward flow 39.

It is believed that the outward lateral flows 38 can have a beneficial effect on the temperature of the molten metal alongside the ribbon by intermingling or mixing with cooler upstream counterflows from the reserve zone as described below.

Figure 4:
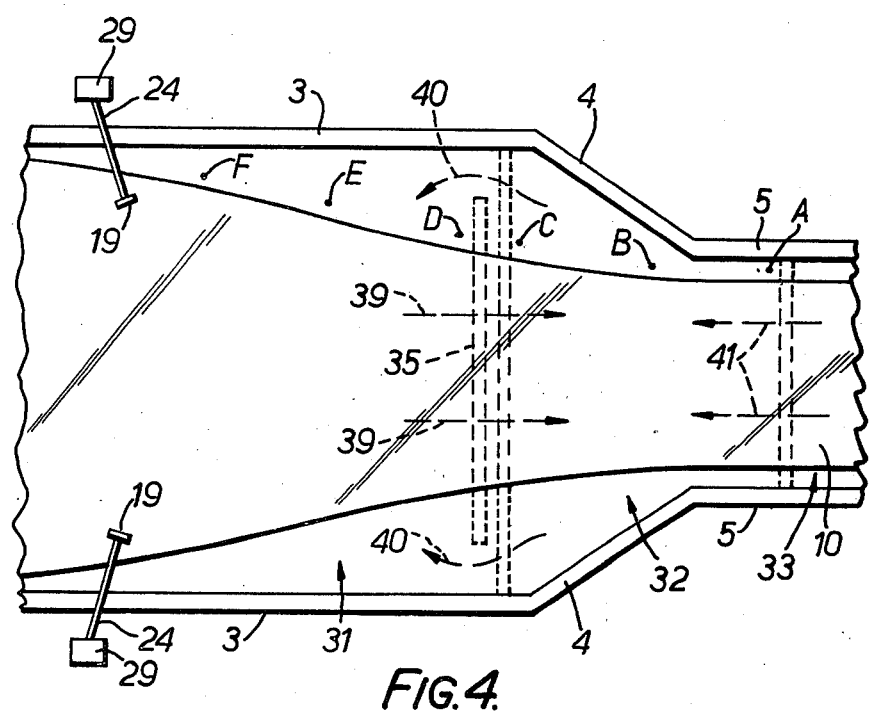
FIG. 4 is an enlarged view of part of FIG. 1.

In the embodiments illustrated barrier 35 extends transversely of the bath beyond the positions of the edges of the ribbon but stops short of the side walls 3. The ends of the barrier 35 are thus spaced from the side walls 3 to define channels for counterflows of molten metal indicated by the arrows 40 in FIG. 4, from the reserve zone 32 downstream of the barrier, round its ends, and into the region upstream of the barrier.

From the foregoing it will be seen that the barrier 35 is at a location in the region of the downstream end of the attenuation zone and constrains molten metal flow at that location to forward flow entrained beneath the ribbon and counterflow alongside the ribbon from downstream of that location. The barrier 35 thus obstructs direct return flow of molten metal along the bath bottom into the region upstream of the barrier location, but permits counterflow round the ends of the barrier from the region of greater bath depth thereby establishing lateral access to the region of the bath supporting ribbon as it is being attenuated by acceleration of the glass upstream of the barrier location.

The transverse barrier 35 is at a location immediately upstream of the upstream end of the deepened region of the bath. For example the barrier 35 may be 150 mm from the upstream end of the pocket region 32. Upstream flow, indicated by arrows 41 in FIGS. 3 and 4 of cooler molten metal travelling along the bath bottom in an upstream direction towards the barrier location is received in the pocket region 32 of greater depth just downstream of the barrier 35. This reduces the velocity of the cooler return flow, thereby giving time for mixing the molten metal of said return flow with molten metal constituting said region of greater bath depth, so that there is time for heating of the molten metal of the return flow to occur, the molten metal in the pocket region 32 effectively acting as a buffer.

Because molten metal of the return flow mixes with molten metal contained in the pocket region 32 counterflows of molten metal coming from the pocket and passing to the region of the bath upstream of the barrier 35, which region is of less bath depth than the pocket, are drawn from the region 32 of greater bath depth. The molten metal entrained by the ribbon from upstream of the barrier, where the glass is accelerating while it is being attenuated, is carried over the barrier and creates a requirement for replenishment of molten metal upstream of the barrier as described previously. Replenishment of molten metal supporting the accelerating glass occurs by the counterflows 40 of molten metal from the pocket region 32 round the ends of the barrier 35 and into the region upstream thereof, the established lateral access enabling those counterflows to be drawn under the ribbon.

It has been found that provision of the region of greater bath depth in which the return cold flow of molten metal is received, ensures that the counterflows of molten metal alongside the ribbon round the ends of the barrier 35 can have a relatively small temperature difference as between the surface molten metal and the molten metal below the surface. Such a small temperature difference as between the top and the bottom of the molten metal reduces the risk of local temperature variations in the molten metal on which the ribbon of glass is carried as it is accelerated, thereby minimising distortion in the undersurface of the ribbon.

Examples of measured top and bottom molten metal temperatures at positions just alongside the edge of the ribbon are given below, the temperatures being measured by thermocouples at a position A towards the downstream end of the pocket 32, that is about 6 meters downwstream of the barrier 35; a position B around the middle of the pocket 32 about 3 meters downstream of the barrier 35; a position C just downstream of the barrier 35, that is at the upstream end of the pocket 32; a position D just upstream of the barrier 35; a position E about 3 meters upstream of the barrier 35; and a position F about 6 meters upstream of the barrier 35, that is about 2 meters downstream of the last top rolls 19.

In one example of operation molten glass was delivered to the bath at a rate of 3326 tonnes per week to produce an ultimate ribbon 2.5 mm thickness having a gross width of 3.74 meters travelling at a speed of 865 meters per hour. The pairs of top rolls 12, and 15 to 19 were spaced along the bath at about 3 meter intervals with the last top rolls 19 about 8.2 meters upstream of the barrier 35, and were disposed with their axes at angles of slew to an axis at right angles to the direction of ribbon advance and were driven at peripheral speeds as follows:

| Top Rolls | Slew Angle | Speed |
| --- | --- | --- |
| 12 | 2° | 165 m/hr |
| 15 | 5° | 181 m/hr |
| 16 | 7° | 201 m/hr |
| 17 | 9° | 232 m/hr |
| 18 | 9° | 291 m/hr |
| 19 | 9° | 340 m/hr |

The top and bottom tin temperatures at the above mentioned positions just alongside the edge of the ribbon were measured as follows:

| Position | Top Tin Temperature (° C) | Bottom Tin Temperature (° C) |
| --- | --- | --- |
| A | 797 | 784 |
| B | 807 | 797 |
| C | 818 | 812 |
| D | 836 | 836 |
| E | 826 | 822 |
| F | 841 | 826 |

It will be seen that just upstream of the barrier 35, at position D, the top to bottom bath temperature difference was zero, and was less than 5° C. at a position about 3 meters further upstream at position E.

Figure 5:
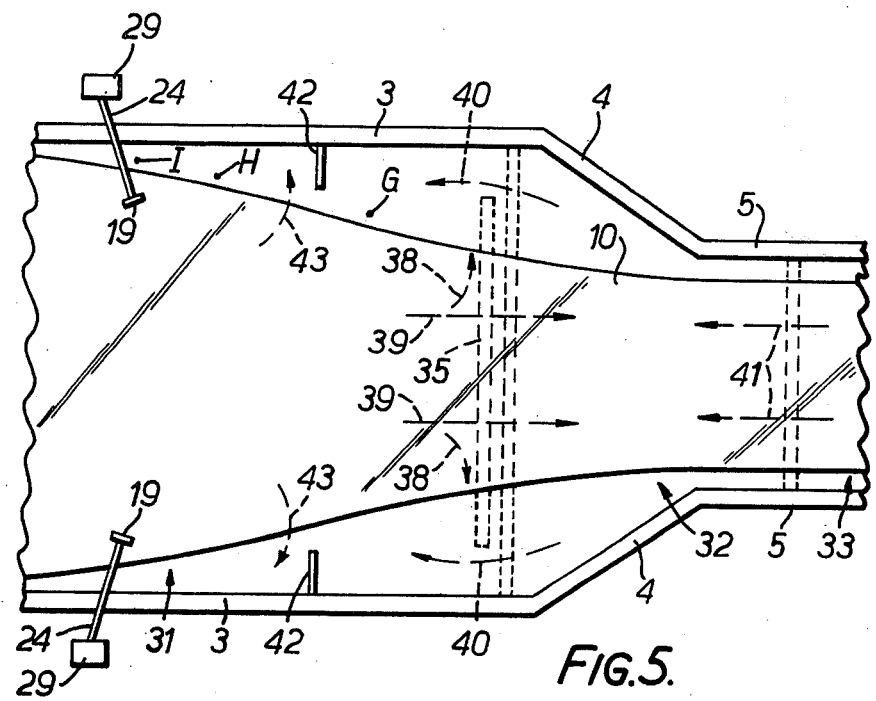
FIG. 5 is a view similar to FIG. 4 illustrating a modification of the apparatus of FIGS. 1 to 4.

It has been found that the temperature uniformity can be further improved, i.e. the top to bottom temperature difference in the molten metal reduced further upstream of the barrier, if longitudinal molten metal flows adjacent the bath side walls are obstructed at a position upstream from the barrier location. To achieve this a pair of carbon baffles or flags 42 may be mounted adjacent the side walls 3 respectively at opposed positions spaced upstream from the barrier 35 as shown in FIG. 5. The flags or baffles 42 have a height greater than the bath depth, are seated on the floor and abut against the side wall so as to obstruct completely longitudinal molten metal flows adjacent the side walls. It is believed that such obstruction of longitudinal side flows improves intermingling or mixing of outwardly directed flows, indicated by arrows 43, of relatively hot surface molten metal from beneath the ribbon, with the counterflows 40 of cooler molten metal coming from the deeper bath region downstream of the barrier, such mixing or intermingling occurring at position alongside and not under the ribbon.

The flags or baffles 42 are believed to prevent the counterflows 40 from travelling along the bath side walls and then under the ribbon at an upstream position without having mixed with the flows 43.

In an example of operation carbon flags or baffles 42 were mounted adjacent the side walls 3 at opposed positions about 3 meters upstream of the barrier location, the flags projecting inwardly from the side wall by a distance of about 460 mm. Molten glass was delivered to the bath at a rate of 3400 tonnes per week to produce an ultimate ribbon of 2.5 mm thickness having a gross width of 3.62 meters and travelling at a speed of 865 meters per hour. The top roll positions were the same as in the previously described example but the angles of slew of the last three pairs were altered, and the speeds very slightly different as follows:

| Top Rolls | Slew Angle | Speed |
| --- | --- | --- |
| 12 | 2° | 165 m/hr |
| 15 | 5° | 182 m/hr |
| 16 | 7° | 202 m/hr |
| 17 | 7° | 234 m/hr |
| 18 | 8° | 292 m/hr |
| 19 | 8° | 338 m/hr |

With this arrangement the top and bottom bath temperatures at positions just alongside the ribbon edge upstream of the barrier were measured, the actual positions in this case being position G about 3 meters upstream from the barrier and about 1 meter downstream of the carbon flag or baffle 42; position H about 2.1 meters upstream of the carbon flag or baffle 42; and position I approximately at the position of the last top roll 19. The measured temperatures were:

| Position | Top Tin Temperature (° C) | Bottom Tin Temperature (° C) |
|---|---|---|
| G | 840 | 842 |
| H | 837 | 828 |
| I | 851 | 839 |

It will be seen that at position G just downstream of the carbon flag or baffle 42 the top to bottom temperature difference was only 2° C., the bath bottom in fact being hotter than the top and at position H upstream of the flag or baffle the difference was only 9° C., which compares favourably with the 15° difference at roughly the same position F in the previous example. Even at the last top roll position I the top to bottom bath temperature difference was only 12° C.

Figure 6:
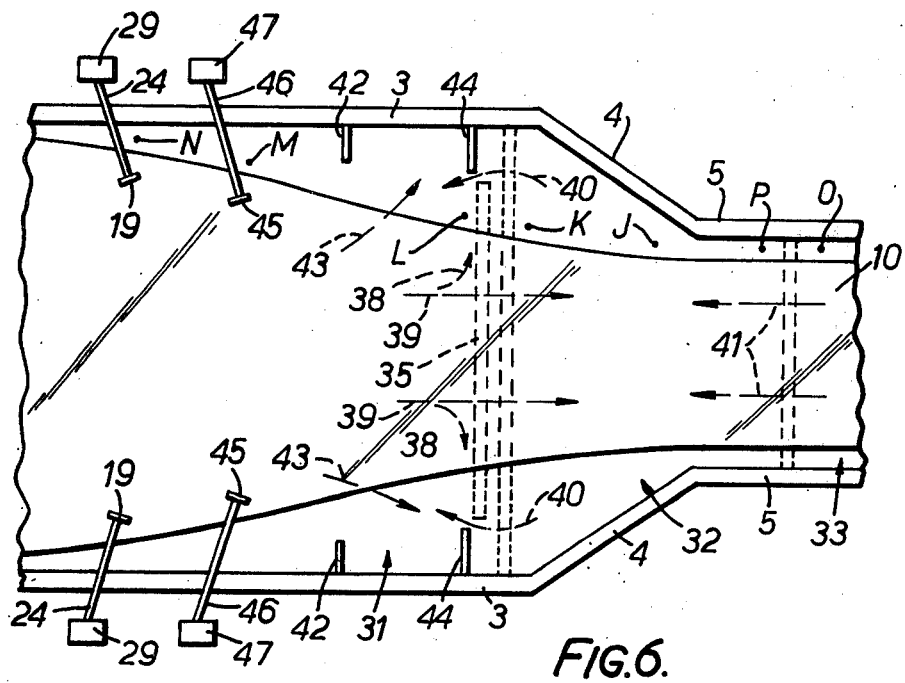
FIG. 6 is a view similar to FIG. 5 illustrating a further modification of the apparatus of FIGS. 1 to 4.

If desired longitudinal molten metal flows adjacent the bath side walls may be obstructed at more than one position upstream from the barrier location. For example, as shown in FIG. 6, there may be provided a further pair of carbon flags or baffles 44 mounted adjacent the side walls 3 at oppositely disposed positions and spaced downstream from the flags or baffles 42 so as to be located close to, but slightly upstream of, the barrier location. The spaces between the end of the barrier 35 and the inner ends of the flags or baffles 44 is sufficient to permit counterflows 40 of molten metal therethrough. The dimensions of the flags or baffles 42 and 44, i.e. the extent to which they project inwardly from the bath side walls 3, are selected to suit the particular requirements of operation and the upstream flags or baffles 42 may project inwardly a different distance from that of the downstream flags or baffles 44. The effect of the additional pair of flags or baffles 44 as shown in FIG. 6 is similar to that of the first pair 42 in that they are believed to cause outward flows 43 of hot molten metal from beneath the ribbon better to mix or intermingle with the counterflows 40 at a position alongside the ribbon, and to prevent the counterflows 40 from travelling along the bath side wall and then under the ribbon at an upstream position without mixing.

FIG. 6 also shows an additional pair of top rolls 45, mounted on shafts 46 driven by motors 47, at oppositely disposed positions spaced downstream of the top rolls 19. This furthest downstream pair of top rolls 45 are useful when producing glass thinner than that of the previous examples.

In one example of operation with an arrangement as shown in FIG. 6 molten glass was delivered to the bath at a rate of 3380 tonnes per week to produce an ultimate ribbon of thickness 2.3 mm having a gross width of 3.65 meters and travelling at a speed of 940 meters per hour. The carbon flags or baffles 42 projected inwardly 610 mm from the side walls 3 and the carbon flags or baffles 44 projected inwardly 460 mm from the side walls 3. The position of the top rolls 12 and 15 to 19 were as described in the previous examples and the additional top rolls 45 were at a position spaced about 3 meters downstream from the top rolls 19, that is about 5.2 meters upstream from the barrier 35 and 2.2 meters upstream from the flags or baffles 42. The slew angles and peripheral speeds of the driven top rolls were as follows:

| Top Rolls | Slew Angle | Speed |
|---|---|---|
| 12 | 2° | 164 m/hr |
| 15 | 3° | 182 m/hr |
| 16 | 5° | 202 m/hr |
| 17 | 7° | 234 m/hr |
| 18 | 8° | 292 m/hr |
| 19 | 8° | 338 m/hr |
| 45 | 8° | 400 m/hr |

The top and bottom bath temperatures were measured just alongside the ribbon edge at a position J about 3 meters downstream from the barrier 35, that is in the pocket 32; position K just downstream of the barrier 35 at the upstream end of the pocket 32; position L just upstream of the barrier 35 and flag 44; position M approximately at the position of the top roll 45; and at position N approximately at the position of the top roll 19. The measured temperatures were:

| Position | Top Tin Temperature (° C) | Bottom Tin Temperature (° C) |
|---|---|---|
| J | 811 | 799 |
| K | 813 | 797 |
| L | 842 | 842 |
| M | 854 | 837 |
| N | 865 | 856 |

It will be seen that the top to bottom temperature difference just upstream of the barrier 35 at position L was again zero, as at position D in the example described above with reference to FIG. 4. The top to bottom temperature difference at the position of the top roll 19, position N, was only 9° C. However, at the position of the last pair of top rolls 45, the top to bottom bath temperature difference was somewhat higher being 17° C. at position M.

The flags or baffles 42 and 44 were then changed to increase their length by 150 mm so that the flags or baffles 42 had a length of inward projection from the side walls 3 of 760 mm and the flags or baffles 44 had a length of inward projection of 610 mm. The inner ends of the flags or baffles 42 were then only about 155 mm from the edges of the ribbon.

In an example of operation with this modified flag or baffle arrangement, molten glass was delivered to the bath at a rate of 3370 tonnes per week to produce an ultimate ribbon of 2.3 mm thickness having a gross width of 3.58 meters travelling at a speed of 940 meters per hour. The positions of the top rolls 45 were moved about 610 mm upstream so as to be about 2.45 meters from the top rolls 19. The top roll angles of slew and speeds were:

| Top Rolls | Slew Angle | Speed |
|---|---|---|
| 12 | 2° | 162 m/hr |
| 15 | 3° | 180 m/hr |
| 16 | 5° | 201 m/hr |
| 17 | 6° | 232 m/hr |
| 18 | 7° | 284 m/hr |
| 19 | 7° | 330 m/hr |
| 45 | 7° | 493 m/hr |

With this arrangement the top to bottom bath temperature difference at the position of the last top rolls 45, that is position M in FIG. 6, was reduced to 12° C.

In another example of operation with an arrangement as shown in FIG. 6 a ribbon of thinner glass was produced at a considerably increased ultimate ribbon speed. Molten glass was delivered to the bath at a rate of 3410 tonnes per week to produce an ultimate ribbon of thickness 1.8 mm having a gross width of 3.37 meters traveling at a speed of 1252 meters per hour. The flags or baffles 42 and 44 were positioned as in the previous two examples, but the flags 42 had an inwardly projecting length of 510 mm and the flags 44 a length of 610 mm. That is in this example the downstream flags 44 were slightly longer than the upstream flags 42. The top rolls were positioned as in the last previously described example and had slew angles and speeds as follows:

| Top Rolls | Slew Angle | Speed |
|---|---|---|
| 12 | 2° | 163 m/hr |
| 15 | 3° | 180 m/hr |
| 16 | 5° | 201 m/hr |
| 17 | 6° | 232 m/hr |
| 18 | 10° | 284 m/hr |
| 19 | 10° | 324 m/hr |
| 45 | 11° | 402 m/hr |

Top and bottom bath temperature measurements just alongside the edge of the ribbon were taken at the previously described positions J, K, L, M and N as well as at further downstream positions, namely a position O just downstream of the downstream end of the pocket 32 and a position P in the pocket 32 just upstream of its downstream end. The measured temperatures were:

| Position | Top Tin Temperature (° C) | Bottom Tin Temperature (° C) |
|---|---|---|
| O | 748 | 729 |
| P | 774 | 754 |
| J | 783 | 772 |
| K | 775 | 765 |
| L | 831 | 830 |
| M | 837 | 818 |
| N | 844 | 830 |

It will be seen that the top to bottom temperature differences are 14° C. at position M at the last top rolls 45; and 19° C. at position N at the next to last top rolls 19. However, even at this high ribbon speed which is about 45% faster than in the first two examples described above and 33% faster than in the other examples, it will be seen that the top to bottom bath temperature difference just upstream of the barrier at position L was only 1° C. Further, the effectiveness of the relatively deep pocket region 32 is particularly apparent from this example in that the top to bottom bath temperature difference at the downstream end of the pocket 32, positions O and P, was about 20° C., but was reduced to about 10° C. at the upstream end of the pocket, positions J and K.

It was also found that the pocket 32 and barrier 35 arrangement had an advantageous effect in reducing lateral temperature variations across the bath and edge to centre temperature variations in the ribbon.

The barrier 35 need not stop short of the side walls of the tank structure as in the embodiments illustrated, but may extend right up to the side walls 3 with recesses in the top of the barrier alongside the ribbon to provide channels for the counterflows of molten metal drawn from the deepened region 32.

The region 33 of lesser bath depth immediately downstream of the region 32, has the same depth as the region 31 upstream of the barrier 35. The region 33 separates the deepened region 32 from the outlet region 34 which has a bath depth less than that in the deepened region 32 but greater than the depth of the regions 31 and 33. The upstanding region 33 provides some obstruction to return flow of cold molten metal along the very bottom of the bath in the outlet region 34, whereby the velocity of the return flow is reduced as the return flow enters the region 32 of greater bath depth and mixing of the return flow with the molten metal in the region 32 is enhanced. The region 33 also provides a region of relatively shallow bath depth at which linear motors mounted over the bath can be used particularly effectively to control molten metal flows. However the bath depth could be constant from the downstream end of the pocket region 32 to the outlet end of the bath. The provision of an increased bath depth along the outlet region 34, relative to that in the region 31 upstream of the barrier 35, facilitates the effective location of coolers in the outlet end of the bath.

Figure 7:
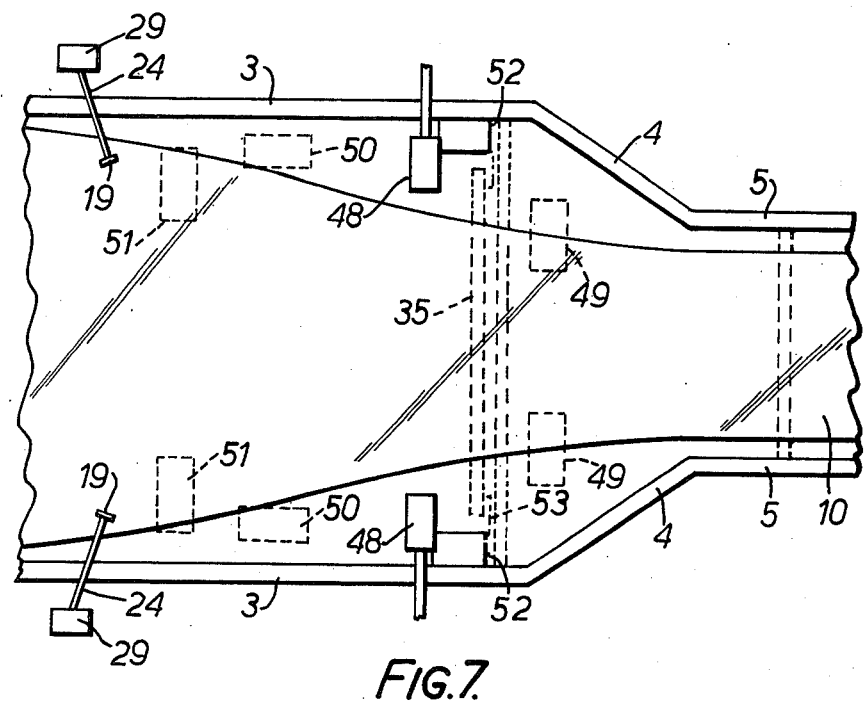
FIG. 7 is a view similar to FIG. 5 illustrating further modifications to the apparatus of FIGS. 1 to 4.

If desired, linear induction motors may be employed to strengthen or control molten metal flows in the region of the barrier 35. FIG. 7 shows a pair of such motors 48 mounted above the bath surface upstream of the barrier 35 to induce electromagnetically flows of molten metal from the counterflows 40 to enter beneath the accelerating ribbon. Alternatively, the motors 48 may induce molten metal flow in an outward direction to strengthen the outward flows 38 and/or 43 and assist mixing or intermingling of those outward flows with the counterflows 40. Linear induction motors may also be positioned as indicated in broken line at 49 in FIG. 7 to assist movement of molten metal in the pocket 32 into the counterflows 40. Further linear induction motors may be positioned as indicated at 50 and 51 to direct the counterflows.

Immersed or partially immersed heaters adapted to effect selective local heating of molten metal flowing under the heaters may also be employed to heat the counterflows. For example, a pair of such heaters 52 may be located one adjacent each end of the barrier 35 to heat the counterflows 40. If necessary, small extension pieces 53 may be provided at each end of the barrier to ensure that all the molten metal flow past each end of the barrier travels under the respective heater 52. Heaters may be employed in conjunction with or in place of the linear induction motors at positions 50 and 51.

As shown in FIG. 8, the floor FL of the tank structure may be formed by abutting blocks 54 of refractory material, preferably alumino-silicate refractory, which are secured in known manner to a metal shell or casing 55 which encases the tank structure. The upper faces of the blocks define the bottom of the molten metal bath. The reserve zone 32 of greater bath depth is defined by blocks having a height dimension less than that of the blocks in the adjacent regions 31 and 33 so that the upper faces of the blocks in the zone 32 are at a lower level than the upper faces of the adjacent blocks.

However, as shown in FIGS. 2 and 3, in which the vertical dimension is greatly exaggerated relative to the horizontal dimension, the blocks may be arranged to provide a stepped bottom to the tank structure so that at the inlet end of the tank structure bath blocks of the same height dimension have their upper faces at different levels to provide different bath depths in regions 30 and 31, and in the region of the outlet end of the bath blocks of different height dimensions have their upper surfaces at the same level to provide the same bath depth in the region 34.

The method and apparatus of the present invention are especially advantageous for producing float glass of thickness in the range 1.5 mm to 3 mm. The invention can be used to advantage in producing float glass of greater thickness when the load and ribbon speed are such that disadvantageous molten metal movement occurs, for example glass of thickness up to 5 mm or more. The method and apparatus of the invention can be used when producing glass of even greater thicknesses.

Although specifically described above in relation to a bath having a shoulder region, the invention can be applied to a tank structure having parallel side walls extending at a constant spacing from the inlet end to the outlet end of the tank structure.

If desired an additional barrier or additional barriers may be located on the floor of the tank structure effectively to project upwardly into the bath at a position or positions spaced upstream from the barrier 35, for example as described in the abovementioned United States Patent Application Serial No. 527,615. Further the barrier 35, although conveniently constructed and mounted in effectively fixed fashion in the floor as described above, could take a different form, for example as described in United States Patent Application No. 527,615 and could, in particular, be cylindrical. Any additional barrier or barriers may also take any of the forms described in the abovementioned Patent Application and may, if desired, be movable between different positions along the bath as therein described.

I claim:

1. A method of manufacturing flat glass comprising advancing a ribbon of glass along a molten metal bath, constraining molten metal flow at a location of the bath substantially to forward flow entrained beneath the ribbon and counterflows alongside the ribbon from downstream of said location, receiving return flow of molten metal travelling in an upstream direction towards said location in a region of greater bath depth than the bath depth in an adjacent region, and establishing lateral access to the region of the bath supporting the ribbon upstream of said location for counterflows of molten metal coming from said region of greater bath depth.

2. A method of manufacturing flat glass comprising advancing a ribbon of glass along a molten metal bath, attenuating the ribbon to a desired width and thickness in an attenuation zone in which the glass accelerates along the bath, constraining molten metal flow at a location in the region of the downstream end of the attenuation zone substantially to forward flow entrained beneath the ribbon and counterflows alongside the ribbon from downstream of said location, receiving return flow of molten metal travelling in an upstream direction towards said location in a region of greater bath depth than the bath depth in an adjacent region, and establishing lateral access to the region of the bath supporting the ribbon upstream of said location for counterflows of molten metal coming from said region of greater bath depth.

3. A method of manufacturing flat glass comprising advancing a ribbon of glass along a molten metal bath, attenuating the ribbon to a desired width and thickness in an attenuation zone in which the glass accelerates along the bath, constraining molten metal flow at a location in the region of the downstream end of the attenuation zone substantially to forward flow entrained beneath the ribbon and counterflows alongside the ribbon from downstream of said location, receiving return flow of molten metal travelling in an upstream direction towards said location in a region of greater bath depth than the bath depth in an adjacent region extending upstream from said location, and establishing lateral access to the molten metal supporting the ribbon in said adjacent region for counterflows of molten metal coming from said region of greater bath depth.

4. A method of manufacturing flat glass comprising advancing a ribbon of glass along a molten metal bath, attenuating the ribbon to a desired width and thickness in an attenuation zone in which the glass accelerates along the bath, constraining molten metal flow at a location in the region of the downstream end of the attenuation zone substantially to forward flow entrained beneath the ribbon and counterflows alongside the ribbon from downstream of said location, receiving return flow of molten metal travelling in an upstream direction towards said location in a region of greater bath depth than the bath depth in a region adjacent said region of greater bath depth and extending upstream from said location, which region of greater bath depth extends for a predetermined distance downstream from the vicinity of said location sufficient to ensure mixing of the molten metal of said return flow with molten metal constituting said region of greater bath depth, and establishing lateral access to the molten metal supporting the ribbon in said adjacent region for counterflows of molten metal coming from said region of greater bath depth.

5. A method according to claim 1, comprising containing the molten metal bath in a tank structure having a floor provided by abutting blocks of refractory material whose upper faces define the level of the bottom of the molten metal bath, and defining said region of greater bath depth by blocks whose upper faces are at a lower level than the upper faces of the blocks defining the bath depth in said adjacent region.

6. A method according to claim 3, comprising constraining said return flow of molten metal upstream towards said region of greater bath depth, to a depth less than the depth of said region of greater bath depth, whereby the velocity of the return flow is reduced as the return flow enters said region of greater bath depth and mixing of the return flow with the molten metal in said region is enhanced.

7. A method according to claim 3, comprising obstructing longitudinal flow of molten metal along the bath sides at a position upstream from said location.

8. A method according to claim 3, comprising obstructing longitudinal flow of molten metal along the bath sides at a plurality of spaced positions upstream from said location.

9. A method according to claim 8, comprising obstructing said longitudinal flow at two spaced positions upstream from said location.

10. A method according to claim 1, comprising electromagnetically inducing flows of molten metal through said lateral access to the region of the bath supporting the ribbon upstream of said location.

11. A method according to claim 1, comprising electromagnetically inducing flows of molten metal from beneath the ribbon upstream of said location to mix with the counterflow.

12. A method according to claim 1, comprising selectively heating said counterflows alongside the ribbon.

13. A method of manufacturing float glass of thickness in the range 1.5 mm to 3 mm comprising:
    advancing a ribbon of glass along a molten metal bath;

attenuating the ribbon to a desired width and thickness in an attenuation zone in which the glass accelerates along the bath;

applying marginal forces to the glass at a series of oppositely disposed positions spaced along the bath to control reduction in ribbon width and thickness;

constraining molten metal flow, at a location in the region of the downstream end of the attenuation zone and spaced downstream from the furthest downstream position at which marginal forces are applied to the ribbon substantially to forward flow entrained beneath the ribbon and counterflows alongside the ribbon from downstream of said location;

receiving return flow of molten metal travelling in an upstream direction towards said location in a region of greater bath depth than the bath depth in an adjacent region extending upstream from said location; and establishing lateral access to the region of the bath supporting the ribbon upstream of said location for counterflows of molten metal from said region of greater bath depth.

14. A method according to claim 13, including obstructing longitudinal flow of molten metal along the bath sides at least at one position upstream from said location and spaced downstream from the furthest downstream position of application of marginal forces to the glass.

15. A method of manufacturing flat glass comprising advancing a ribbon of glass along a molten metal bath, attenuating the ribbon to a desired width and thickness in an attenuation zone in which the glass accelerates along the bath, providing a deepened reserve zone of molten metal downstream of said attenuation zone in which return flows of molten metal from the outlet end of the bath quiesce and are heated, and directing flows of molten metal from that reserve zone alongside the accelerating glass to feed lateral flows of the molten metal drawn into the molten metal flow entrained beneath the accelerating glass.

16. A method of manufacturing flat glass comprising advancing a ribbon of glass along a molten metal bath, attenuating the ribbon to a desired width and thickness in an attenuation zone in which the glass accelerates along the bath, constraining molten metal flow in the region of the downstream end of the attenuation zone to forward flow entrained beneath the ribbon and counterflows alongside the accelerating glass from downstream of the attenuation zone, providing a deepened reserve zone of molten metal downstream of said attenuation zone in which return flows of molten metal from the outlet end of the bath quiesce and are heated, supplying said counterflows by means of flows of molten metal from said reserve zone, and from said counterflows feeding lateral flows of molten metal drawn into the molten metal flow entrained beneath the accelerating glass.

17. A method of manufacturing flat glass comprising advancing a ribbon of glass along a molten metal bath contained in a tank structure having a floor of aluminosilicate refractory blocks whose upper faces are at different depths in different regions of the bath, attenuating the ribbon to a desired width and thickness in an attenuation zone in which the glass accelerates along a relatively shallow region of the bath, providing a reserve of molten metal just downstream of said attenuation zone in a relatively deep region of the bath defined in a recessed part of said refractory floor of the tank structure, receiving in said reserve return flows of cooled molten metal from the outlet end of the bath, which flows quiesce and are heated in said reserve, and directing flows of molten metal from that reserve alongside the accelerating glass to feed lateral flows of molten metal drawn into the molten metal flow entrained in said relatively shallow region beneath the accelerating glass.

18. A method of manufacturing flat glass comprising advancing a ribbon of glass along a molten metal bath contained in a tank structure having a floor of aluminosilicate refractory blocks whose upper faces are at different depths in different regions of the bath, attenuating the ribbon to a desired width and thickness in an attenuation zone in which the glass accelerates along a relatively shallow region of the bath, constraining molten metal flow in the region of the downstream end of the attenuation zone to forward flow entrained beneath the ribbon and counterflows alongside the accelerating glass from downstream of the attenuation zone, providing a reserve of molten metal just downstream of said attenuation zone in a relatively deep region of the bath defined in a recessed part of said refractory floor of the tank structure, receiving in said reserve return flows of cooled molten metal from the outlet end of the bath, which flows quiesce and are heated in said reserve, and directing flows of molten metal from said reserve into said counterflows alongside the accelerating glass to feed lateral flows of molten metal drawn into the molten metal flow entrained in said relatively shallow region beneath the accelerating glass.

19. Apparatus for manufacturing flat glass comprising an elongated tank structure having end walls, side walls and a floor for containing a bath of molten metal, means for delivering glass to the bath at a controlled rate and advancing the glass in ribbon form along the bath, means for applying traction to the ultimate ribbon of glass, and a transverse barrier on the floor of the tank structure at a location in the region of the downstream end of an attenuation zone in which the glass accelerates along the bath and the ribbon is attenuated to a desired width and thickness, the barrier extending beyond the position of the edges of the ribbon and the top of the barrier being positioned below the level of the bath surface by a distance which is effective to constrain molten metal flow at that location substantially to forward flow of molten metal entrained beneath the ribbon and counterflow of molten metal alongside the ribbon, and wherein the floor of the tank structure is shaped to define just downstream of said barrier a reserve zone for molten metal flows, which reserve zone is of greater depth than the bath depth in an adjacent region.

20. Apparatus according to claim 19, wherein the barrier extends beyond the position of the edges of the ribbon but stops short of the tank side walls.

21. Apparatus according to claim 19, wherein the reserve zone defined in the floor of the tank structure just downstream of said barrier is of greater depth than the bath depth upstream of said barrier.

22. Apparatus according to claim 19, wherein the depth of the reserve zone defined in the floor of the tank structure just downstream of said barrier is approximately twice the bath depth in said adjacent region.

23. Apparatus according to claim 19, wherein said reserve zone extends across the full width of the floor of the tank structure.

24. Apparatus according to claim 19, wherein the depth of the reserve zone defined in the floor of the tank structure is greater than the bath depth upstream of the barrier and the bath depth downstream of the reserve zone.

25. Apparatus according to claim 19, wherein the tank structure is encased in a metal casing, the floor of the tank structure comprises abutting blocks of refractory material which are secured to the metal casing, and said reserve zone of greater bath depth is defined by blocks whose upper faces are at a lower level than the upper faces of the blocks in said adjacent region.

26. Apparatus according to claim 25, wherein the upper faces of the blocks in said reserve zone are at a lower level than the upper faces of the blocks upstream and downstream of the reserve zone.

27. Apparatus according to claim 26, wherein the upper faces of the blocks upstream and downstream of the reserve zone are at the same level.

28. Apparatus according to claim 19, wherein the floor of the tank structure downstream of said barrier is constructed to define, considered in the downstream direction, said reserve zone of greater depth than the bath depth upstream of said barrier, a region of lesser depth than the reserve zone, and a further region of greater depth than the bath depth upstream of said barrier which further region extends to the outlet end of the tank structure.

29. Apparatus according to claim 19, wherein an abrupt step is provided where the floor defines a change in bath depth.

30. Apparatus according to claim 19, wherein the elongated tank structure has a shoulder region which joins an upstream part of greater bath width to a downstream part of lesser bath width, said reserve zone of greater bath depth is located at said shoulder region, and the barrier is located just upstream of said shoulder region.

31. Apparatus according to claim 19, including top rolls arranged to engage the upper surface of the ribbon margins at a series of oppositely disposed positions along the bath to control the reduction in width and thickness of the ribbon, the pair of top rolls furthest downstream being at a position spaced upstream from said barrier.

32. Apparatus according to claim 31, including at least one pair of baffles located adjacent the bath side walls at oppositely disposed positions upstream from said barrier and spaced downstream from the furthest downstream pair of said top rolls to obstruct longitudinal flows of molten metal along the bath side walls at those positions.

33. Apparatus according to claim 19, including linear induction motors mounted over the bath surface in the region of the barrier to induce flows of molten metal electromagnetically.

34. Apparatus according to claim 19, including heaters mounted adjacent the tank side walls upstream of the barrier to apply local heating to the counterflows of molten metal.

35. A method of manufacturing flat glass comprising the steps of:
advancing a ribbon of glass along a molten metal bath;
containing the molten metal bath in a tank structure having a floor provided by abutting blocks of refractory material whose upper faces define the level of the bottom of the molten metal bath;
attenuating the ribbon to a desired width and thickness in an attenuation zone in which the glass accelerates along the bath;
constraining molten metal flow at a location in the region of the downstream end of the attenuation zone substantially to forward flow entrained beneath the ribbon and counterflows alongside the ribbon from downstream of said location;
receiving return flow of molten metal travelling in an upstream direction towards said location in a region of greater bath depth than the bath depth in an adjacent region, which region of greater bath depth is defined by blocks of the floor whose upper faces are at a lower level than the upper faces of the blocks defining the bath depth in said adjacent region; and
establishing lateral access to the region of the bath supporting the ribbon upstream of said location for counterflows of molten metal coming from said region of greater bath depth.

36. A method of manufacturing flat glass comprising:
advancing a ribbon of glass along a molten metal bath;
applying traction to the ultimate ribbon of glass to accelerate the glass to a final discharge speed thereby causing, as the glass accelerates, progressively increasing entrainment of molten metal of the bath over an upstream return flow of cooler molten metal from the outlet end of the bath; and
in the region of the bath where the final discharge speed of the ribbon is achieved, receiving the upstream return flow of cooler molten metal in a reserve zone of greater bath depth than the adjacent bath depth both upstream and downstream of that zone, in which reserve zone the upstream return flow of cooler molten metal mixes with hotter molten metal held therein and from which reserve zone there are drawn upstream molten metal flows to replenish the molten metal entrained by the accelerating ribbon.

37. Apparatus for manufacturing flat glass comprising:
an elongated tank structure having end walls, side walls and a floor for containing a bath of molten metal;
a metal casing encasing the tank structure;
means for delivering glass to the bath at a controlled rate and advancing the glass in ribbon form along the bath;
means for applying traction to the ultimate ribbon of glass; and
a transverse barrier on the floor of the tank structure at a location in the region of the downstream end of an attenuation zone in which the glass accelerates along the bath and the ribbon is attenuated to a desired width and thickness, the barrier extending beyond the position of the edges of the ribbon and the top of the barrier being positioned below the level of the bath surface by a distance which is effective to constrain molten metal flow at that location substantially to forward flow of molten metal entrained beneath the ribbon and counterflow of molten metal alongside the ribbon; and wherein
the floor of the tank structure comprises abutting blocks of refractory material which are secured to said metal casing, and just downstream of said barrier the upper faces of said blocks are at a lower level than the upper faces of the blocks in adjacent upstream and downstream regions of the floor thereby defining just downstream of said barrier a reserve zone for molten metal flows which reserve zone is of greater bath depth than the bath depth downstream of the barrier and the bath depth downstream of the reserve zone.

38. In apparatus for manufacturing flat glass comprising an elongated tank structure having end walls, side walls and a floor, for containing a bath of molten metal, means for delivering glass to the bath at a controlled rate and advancing the glass in ribbon form along the bath, and means for applying traction to the ultimate ribbon of glass to accelerate the glass to a final discharge speed, the improvement wherein:

in the region of the tank structure where the ribbon achieves its final discharge speed, the floor of the tank structure is deepened to define a reserve zone, in which the floor of the tank structure is recessed below the level of the adjacent floor of the tank structure both upstream and downstream of said reserve zone, for receiving cooler molten metal flow which is enforced in an upstream direction over the floor by the entrainment of hotter molten metal by the advancing ribbon of glass, and for mixing the upstream return flow of cooler molten metal with hotter molten metal held in said reserve zone.

* * * * *